(12) United States Patent
Kuenkel et al.

(10) Patent No.: US 8,545,152 B2
(45) Date of Patent: Oct. 1, 2013

(54) SCREW WHICH CAN BE SCREWED INTO A COMPONENT

(75) Inventors: Rolf Kuenkel, Bad Berleburg (DE);
Walter Kornsteiner, Muntlix (AT);
Reinhold Lenherr, Staad (CH); Axel Tome, Göppingen (DE)

(73) Assignee: Ejot GmbH & Co., KG, Bad Laasphe (DE)

( * ) Notice: Subject to any disclaimer, the term of this patent is extended or adjusted under 35 U.S.C. 154(b) by 318 days.

(21) Appl. No.: 13/120,004

(22) PCT Filed: Sep. 22, 2009

(86) PCT No.: PCT/EP2009/006844
§ 371 (c)(1),
(2), (4) Date: Jun. 6, 2011

(87) PCT Pub. No.: WO2010/031590
PCT Pub. Date: Mar. 25, 2010

(65) Prior Publication Data
US 2011/0236153 A1    Sep. 29, 2011

(30) Foreign Application Priority Data
Sep. 22, 2008 (DE) .................. 10 2008 048 321

(51) Int. Cl.
*F16B 33/04* (2006.01)
(52) U.S. Cl.
USPC .................. 411/7; 411/6; 411/295; 411/326; 411/383; 411/395; 411/961

(58) Field of Classification Search
USPC .............. 411/6, 7, 293–295, 326, 366.1, 370, 411/383, 395, 432, 508, 509, 925, 949, 950, 411/961; 16/2.4
See application file for complete search history.

(56) References Cited

U.S. PATENT DOCUMENTS

| | | | | |
|---|---|---|---|---|
| 33,251 A | * | 9/1861 | Hoyt | 411/214 |
| 884,290 A | * | 4/1908 | De Oca | 411/143 |
| 1,182,310 A | * | 5/1916 | Plopper | 411/326 |
| 1,377,397 A | * | 5/1921 | Chance | 411/138 |
| 3,273,443 A | * | 9/1966 | Rubin | 411/7 |
| 3,425,314 A | * | 2/1969 | Ohlson | 411/7 |

(Continued)

FOREIGN PATENT DOCUMENTS
CH 683790 A5 5/1994
FR 2 791 404 A1 9/2000
FR 2 841 946 A1 1/2004

*Primary Examiner* — Roberta Delisle
(74) *Attorney, Agent, or Firm* — Birch, Stewart, Kolasch & Birch, LLP

(57) ABSTRACT

The invention relates to a screw which can be screwed into a component and which will resist further screwing into an internal thread within said component once a maximum torque has been reached. For this purpose, a screw body having an external thread is combined with a screw drive element which projects into a bore within said screw body and, within said bore, is connected to the screw body via static friction. At least part of this combination is made of a plastic material, with the static friction having the effect of a slipping clutch when a maximum torque acts on the screw drive element. The screw drive element is connected to the screw body via a ratchet in such a way that when the screw body is unscrewed from the internal thread within said component, turning said screw drive element will cause the ratchet to engage, thereby entraining the screw body.

4 Claims, 2 Drawing Sheets

(56) References Cited

U.S. PATENT DOCUMENTS

| | | | |
|---|---|---|---|
| 3,477,337 A * | 11/1969 | Racki | 411/28 |
| 3,540,509 A * | 11/1970 | Gutshall | 411/145 |
| 4,687,392 A | 8/1987 | Bidwell | |
| 6,070,774 A | 6/2000 | Rak et al. | |

\* cited by examiner

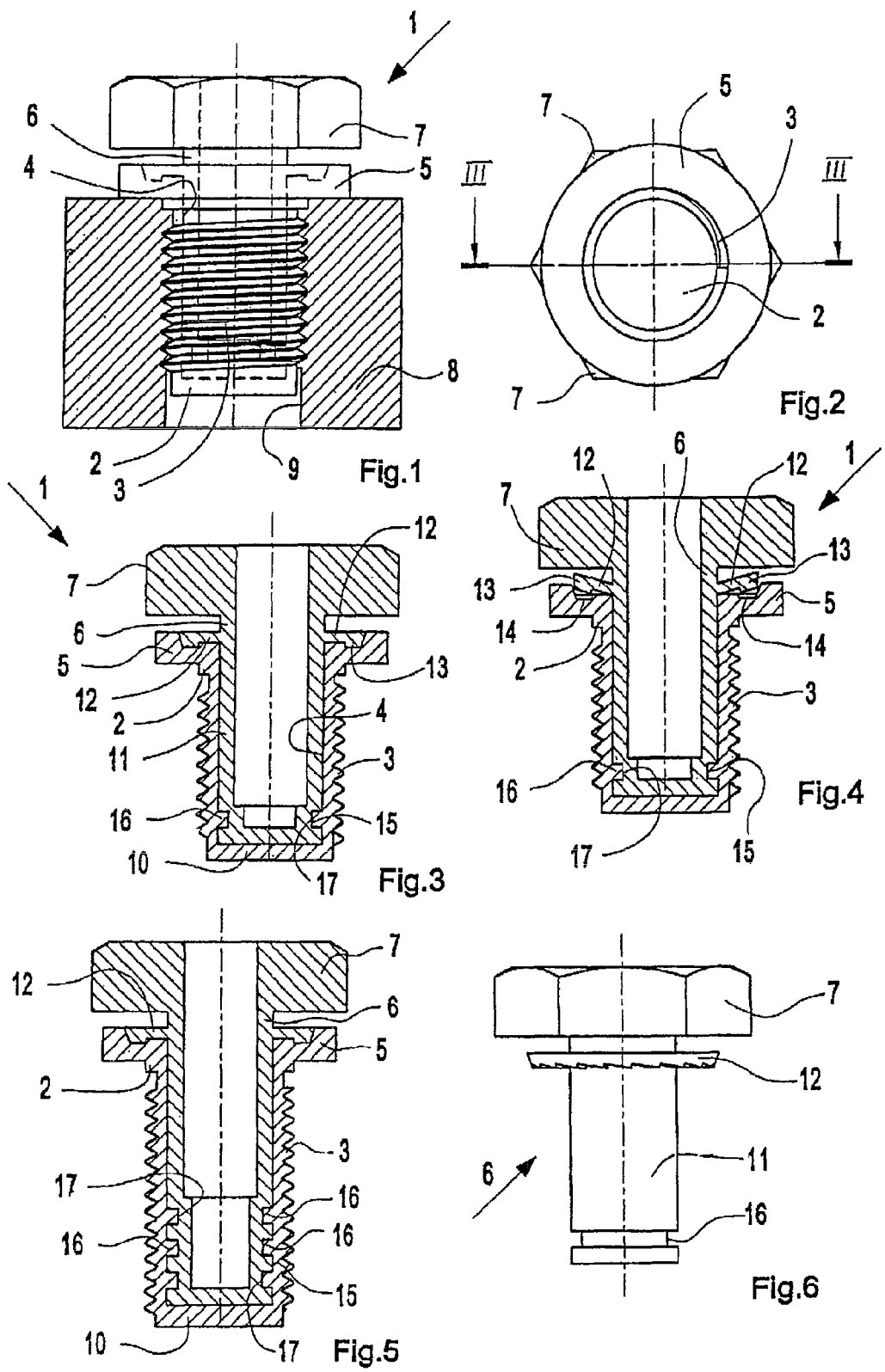

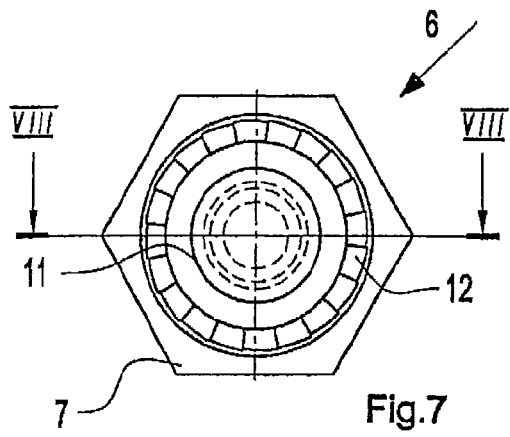
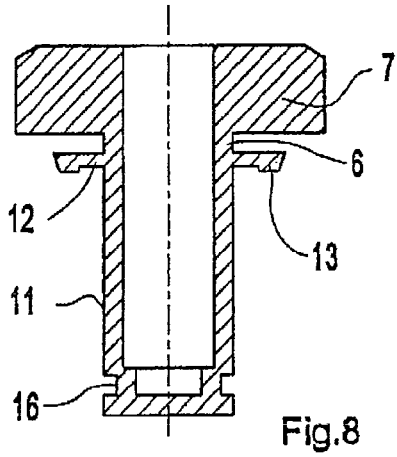
Fig.7
Fig.8
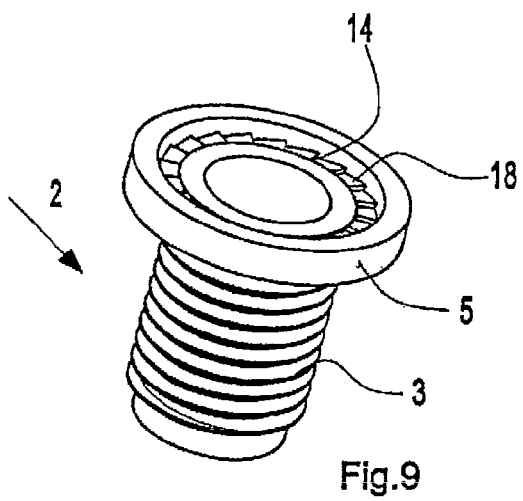
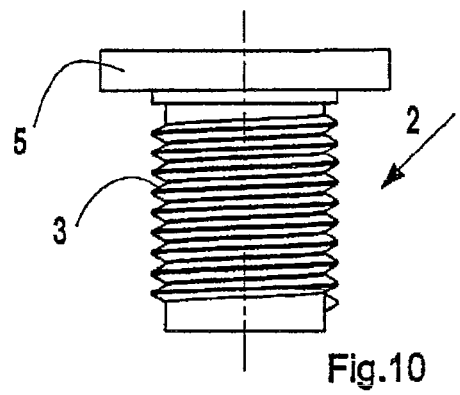
Fig.9
Fig.10
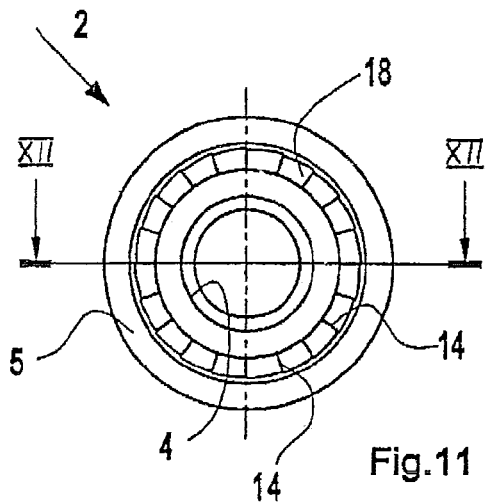
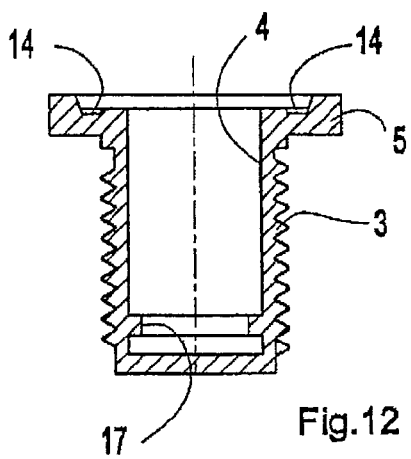
Fig.11
Fig.12

SCREW WHICH CAN BE SCREWED INTO A COMPONENT

The invention relates to a screw which can be screwed into a component and which will resist further screwing into an internal thread of said component once a maximum torque has been reached.

A screw of this type is disclosed in the Swiss patent specification no. CH 683 790 A5. This prior art screw, which is referred to as a two-piece fastener, consists of two parts, i.e. a tubular part having an internal thread and an external thread onto which is mounted an external part having the external shape of a hexagonal nut without an internal thread and which can be twisted with regard to said tubular part. The external part and a flange provided on said tubular part, together with respective projections on the external part, form a ratchet which is designed such that when the external part is being turned in the one direction of rotation, the tubular part will be firmly entrained, whereas when the external part is being turned in the opposite direction, said ratchet will act between the external part and the tubular part, thus accordingly restricting the torque transferred by the tubular part in this direction of rotation. This restriction is essentially achieved by means of a spring pack which—on the one hand—presses against a nut screwed onto the external thread of the tubular part and—on the other hand—against the external part so as to cause the projections on said external part to press against the corresponding parts on the flange of the tubular part.

It is the object of the present invention to create a screw which can be screwed into the internal thread of a component and which—once a maximum torque has been reached—will resist further screwing into the component. With a view to creating a simple design, merely two parts are to cooperate correspondingly. According to the invention, this is accomplished by a combination of a screw body having an external thread and a screw drive element which protrudes into a bore in said screw body and, within said bore, is connected to said screw body via static friction. At least part of this combination is made of a plastic material and the static friction acts as a slipping clutch when a maximum torque acts on the screw drive element, and the screw drive element is connected to said screw body via a ratchet in such a way that when the screw body is unscrewed from said internal thread in the component, turning the screw drive element will cause the ratchet to engage, thereby entraining the screw body.

In the case of the screw according to the invention, the task of restricting the torque acting on the screw body is accomplished by using the screw drive element for screwing the externally threaded screw body into the internally threaded component. In doing so, the screw drive element will take up the screw body, with the smooth round surface of the screw drive element fitting into the equally smooth round inner surface of the screw body in such a way that there will be static friction between the screw drive element and the screw body which will then have the effect of a slipping clutch. The characteristic feature of a slipping clutch can thus be exploited in that this slipping clutch will only be effective up to a certain maximum torque and beyond that will slip so as to avoid excessive strain on the inventive screw as it is being screwed into a component and to prevent damage to the component. To be able to safely remove the screw from the component again, however, the screw drive element is connected to the screw body via a ratchet in such a way that when the screw body is unscrewed from an internal thread, turning the screw drive element will cause the ratchet elements provided on the two parts to engage, thereby entraining the screw body. Consequently, this on the one hand allows the screw to be tightened by means of the screw drive element, with only restricted torque acting on the screw, and on the other hand, the screw drive element can also be used to unscrew the screw from the component in which it is accommodated. The screw drive element can be turned by an external or an internal drive.

The ratchet provided on the screw is to be expediently designed such that the screw body having a support flange will be located opposite an annular arm on a screw drive element, with said support flange and said annular carrying latching elements and spring elements of said ratchet, with locking groove means holding the screw body and the screw drive element in place to prevent their shifting axially with respect to each other. Forming the screw body and the screw drive element with a support flange and an annular arm respectively is a low-cost way of designing the ratchet. In this case, the locking groove means will hold the screw body in place with respect to the screw drive element so that once the screw body and the screw drive element have been put together, said locking groove means will prevent these two parts from coming apart too easily, thus ensuring the constant proper functioning of the ratchet.

The entrainment torque of the slipping clutch which effectively operates in the inventive screw in a particular manner can be easily adjusted based on the area of the slipping clutch. This means that the longer the length and the wider the diameter of the screw body and the screw drive element and the respective engaging surfaces of these parts are, the easier it will be to adjust, i.e. to increase or decrease, the entrainment torque of the slipping clutch.

For the locking groove means, several coaxial grooves and projections may expediently be provided. The higher the number of these elements, the better the components will be secured axially with respect to each other.

The external thread of the screw body can be any normal thread that can be screwed into an existing internal thread of a component. However, this external threat can also be designed in such a way that it acts as a self-tapping thread which—as the screw body is being screwed into a component—will actually cut the internal thread itself due to this feature. In this case, the screw body is to be made from an appropriately hard metal, and a plastic material is to be chosen for the screw drive element with which the required slipping clutch can then be obtained.

Shown in the drawings is an embodiment of the invention. Of the drawings,

FIG. 1 is a view of the screw composed of the screw body and the screw drive element;

FIG. 2 is a top view of the external thread and the support flange of the screw body;

FIG. 3 is a sectional view taken along line of FIG. 2 with the ratchet in an engaged state;

FIG. 4 is a view similar to the one of FIG. 3, but with the ratchet in a disengaged state;

FIG. 5 is a view similar to the one of FIG. 3, showing several locking groove means;

FIG. 6 is a view of the screw drive element only;

FIG. 7 is a top view of the shank and the annular arm of the screw drive element of FIG. 6;

FIG. 8 is a sectional view taken along line VIII-VIII of FIG. 7;

FIG. 9 is a perspective view of the screw body only;

FIG. 10 is a lateral view of the screw body of FIG. 9;

FIG. 11 is a top view of the screw body of FIG. 9;

FIG. 12 is a sectional view taken along line XII-XII of FIG. 11.

The screw 1 according to the invention as illustrated in FIG. 1 consists of a screw body 2 with an external thread 3. The screw body 2 has a bore 4 which can be clearly seen in the individual view of FIG. 12. In FIG. 1, the bore 4 is merely indicated by dashed lines. Furthermore, the screw body 2 includes a support flange 5 whose function will be explained in more detail with reference to FIGS. 3 and 4. Inserted in said screw body 2 is the screw drive element 6 which fills the bore 4 almost completely and forms a slipping clutch with regard to the bore 4—which will be explained in more detail with respect to FIG. 3. The screw drive element 6 includes a drive flange 7 which in this case takes the form of a hexagonal bolt which can be easily gripped by a hexagon wrench. However, a square flange or an appropriate central recess for accommodating an Allen wrench may also be provided in its stead. The cooperation of the support flange 5 and the drive flange 7 will be set out in more detail below with reference to FIGS. 3 and 4. Further illustrated in FIG. 1 is the component 8, which may be some sort of board or the like, with the internally threaded bore 9 into which the screw body 2 has been screwed.

FIG. 2 is a top view of the end of the body 2 of the screw 1 only.

FIG. 3 is a sectional view, taken along line of FIG. 2, of only the screw according to the invention. As can be seen from FIG. 3, the end of the screw body 2 facing away from said drive flange 7 is closed by the bottom 10. Inserted in said bore 4 is the shank 11 of the screw drive element 6, with the outer surface of said shank 11 and the inner surface of the bore 4 of said screw body 2 contacting each other smoothly yet with some amount of friction in such a way that the contact surface will form a slipping clutch. This has the effect that when the screw drive element 6 is being turned, it will entrain the screw body 2—as a result of the slipping clutch created by the friction between the shank 11 and the bore 4—but only for as long until—due to an inhibition in the rotation of the screw body 2—the latter will be restrained, and from this torque onwards, the shank 11 of the screw drive element 6 will turn within said screw body. As of this state, the screw body 2 would thus no longer be entrained by the screw drive element 6 when the latter is being turned further.

The friction that needs to exist between the two respective clutch parts (in this case the outer surface of the shank 11 of the screw drive element 6 and the inner surface of the bore 4 of the screw body 2) for a slipping clutch to be formed can be created depending on the desired maximum torque, that is anything from a particularly smooth surface to a more or less roughened surface can be used for this purpose. The latter design may be advantageously achieved for example by first processing the screw drive element 6 with its shank 11, with individual recesses, longitudinal slots, cross slots and the like being for example made in said shank 11, and then using an injection-moulding process for fitting the screw body 2 onto the shank 11 such designed. In this way, the inner surface of the bore 4 of the screw body 2 will then automatically conform to the design of the surface of the shank 11 of the screw drive element 6. In this design, the more the respective surfaces differ from a smooth surface, the more friction-based entrainment there will be between the two parts and thus a corresponding increase of the maximum torque when the screw 1 is being screwed into some component 8. Another way of varying the maximum torque consists in appropriately selecting the materials for the screw body 2 and the screw drive element 6. It is possible, for example, to make the screw drive element 6 from metal, for example steel, and to produce the screw body 2 from a plastic material which can be advantageously injection-moulded around the shank 11 of the screw drive element 6.

FIG. 3 furthermore shows the annular arm 12 which extends radially from the shank 11 of the screw drive element. Owing to its special design, this annular arm 12 is capable of flexing in an axial direction and can thus be used as part of a ratchet. In the view of FIG. 3 this annular arm 12, which has a thickened end 13, is pressed into corresponding recesses 14 made in the support flange 5. The function of the part formed by the annular arm 12 will be explained in more detail below with reference to FIG. 4.

FIG. 4 shows the embodiment of FIG. 3, however, in a position of the screw drive element 6 with respect to the support flange 5 in which the screw drive element 6 has been slightly turned as compared to its position in FIG. 3. In the position of the screw drive element 6 relative to the screw body 2 as illustrated in FIG. 4, the annular arm 12 has been lifted out of the respective recesses 14—which momentarily interrupts the coupling of the screw drive element 6 and the screw body 2—and in this position, the screw drive element 6 will turn relative to the screw body 2 once the restricted torque is exceeded.

The mode of action of the annular arm 12 with respect to the recesses 14 in the support flange 5 provided on the screw body 2 may also be used to further regulate the maximum torque controlled by the slipping clutch, i.e. to either achieve a slight slipping of the screw body 2 relative to the screw drive element 6 or a stronger connection of the screw drive element 6 to the screw body 2. This connection depends on the design and the depth of the recesses 14 as well as on the height of the thickened end 13 of the annular arm 12.

Shown in FIGS. 3 and 4 is a locking groove means 15 for accomplishing axial locking of the screw drive element 6 and the screw body 2. Said locking groove means 15 consists of the groove 16 (see FIG. 6) provided on the shank 11 and the annular projection 17 (see FIG. 12) on the screw body 2. As shown in FIG. 5, three of said locking groove means 15 are provided in an axial direction—which of course also changes the maximum torque of the slipping clutch accordingly.

FIGS. 6, 7 and 8 are views of the screw drive element 6 only. More precisely, FIG. 6 is a view of the drive flange 7, the shank 11, the annular arm 12 and the groove 16.

FIG. 7 is a view of the screw drive element 6 of FIG. 6 illustrating the end of the shank 11 facing away from the drive flange 7.

FIG. 8 is a sectional view of the screw drive element 6 of FIG. 6 taken along line VIII-VIII of FIG. 7.

FIGS. 9 to 12 are views of only the screw body 2 of FIGS. 1 to 5. The perspective view of FIG. 9 here clearly shows the ratchet 18 with its toothing. Its teeth are inclined so as to ensure that when the screw drive element 6 is being turned, its annular arm 12 (see FIG. 8) will easily slide across the respective recesses 14 due to their inclination in a direction of rotation (clockwise), whereas in the opposite direction (i.e. counter-clockwise) they will be retained by the steep boundaries of the individual recesses 14.

FIG. 10 is a lateral view of the screw body 2, FIG. 11 is a top view of the bottom 10, and FIG. 12 is a sectional view taken along line XII-XII of FIG. 11.

The invention claimed is:

1. A screw which can be screwed into a component and which will resist further screwing into an internal thread within said component once a maximum torque has been reached wherein the combination of a screw body having an external thread and a screw drive element which projects into a bore in the screw body and which, inside this bore, is connected to the screw body through static friction, with at least part of the combination being made of a plastic material and said static friction acting as a slipping clutch when a maximum torque acts on the screw drive element, and with the screw drive element being connected to the screw body via a ratchet in such a way that when the screw body is unscrewed from the internal thread within said component, turning the screw drive element will cause the ratchet to engage, thereby entraining the screw body, and wherein said screw body including a support flange is positioned opposite said screw drive element including an annular arm, and that the support flange and the annular arm carry latching elements and spring elements of the ratchet, wherein any mutual axial shifting of the screw body and the screw drive element will be prevented by locking groove means.

2. The screw of claim 1 wherein the entrainment torque of the slipping clutch is determined by its area.

3. The screw of claim 2 wherein said locking groove means (15) consists of several coaxial grooves (16) and projections (17).

4. The screw of claim 1 wherein the external thread (3) of the screw body (2) is a self-tapping thread.

* * * * *